(12) United States Patent
Chen et al.

(10) Patent No.: US 11,878,298 B2
(45) Date of Patent: Jan. 23, 2024

(54) DEVICE FOR ONLINE DETECTION OF ATMOSPHERIC SALT FOG CONTENT AND DETECTION METHOD THEREOF

(71) Applicant: CHINA NATIONAL ELECTRIC APPARATUS RESEARCH INSTITUTE CO., LTD., Guangdong (CN)

(72) Inventors: Chuan Chen, Guangdong (CN); Li Xiang, Guangdong (CN); Jun Wang, Guangdong (CN); Ganxin Jie, Guangdong (CN); Yue Zhao, Guangdong (CN)

(73) Assignee: CHINA NATIONAL ELECTRIC APPARATUS RESEARCH INSTITUTE CO., LTD., Guangdong (CN)

( * ) Notice: Subject to any disclaimer, the term of this patent is extended or adjusted under 35 U.S.C. 154(b) by 619 days.

(21) Appl. No.: 17/260,555

(22) PCT Filed: Dec. 13, 2019

(86) PCT No.: PCT/CN2019/125041
§ 371 (c)(1),
(2) Date: Jan. 15, 2021

(87) PCT Pub. No.: WO2020/207046
PCT Pub. Date: Oct. 15, 2020

(65) Prior Publication Data
US 2021/0268495 A1 Sep. 2, 2021

(30) Foreign Application Priority Data
Apr. 9, 2019 (CN) .......................... 201910278937.8

(51) Int. Cl.
*G01N 33/68* (2006.01)
*G01N 21/33* (2006.01)
(Continued)

(52) U.S. Cl.
CPC ............ *B01L 3/5023* (2013.01); *G01N 21/01* (2013.01); *G01N 21/31* (2013.01); *G01N 35/04* (2013.01);
(Continued)

(58) Field of Classification Search
CPC . B01L 3/5023; B01L 2300/069; G01N 21/01; G01N 21/31; G01N 35/04;
(Continued)

(56) References Cited

U.S. PATENT DOCUMENTS 4,154,579 A    5/1979   Kreisel

FOREIGN PATENT DOCUMENTS

CN    103091135         5/2013
CN    105181614 A   *  12/2015
(Continued)

OTHER PUBLICATIONS

State Administration for Market Regulation, "Corrosion of metals and alloys—Corrosivity of atmospheres—Part 3: Measurement of environmental parameters affecting corrosivity of atmospheres" National standards of People's Republic of China, GB/T 19292.3-2018, May 14, 2019, with English abstract thereof, pp. 1-26.
(Continued)

*Primary Examiner* — Jennifer Wecker
*Assistant Examiner* — Oyeleye Alexander Alabi
(74) *Attorney, Agent, or Firm* — JCIP GLOBAL INC.

(57) ABSTRACT

A device for online detection of an atmospheric salt fog content and a detection method thereof are provided. The device comprises a sampling module and an analysis module. The sampling module comprises a liquid absorbent
(Continued)

storage tank (64), a liquid reagent storage tank (61), an air pump (51), a relay pump (52), a sampling bottle (212), a reaction bottle (21), a sampling syringe (29), and a cuvette (32). The air pump (51) is used to draw air into the sampling bottle (212). The relay pump (52) is used to draw a liquid absorbent in the liquid absorbent storage tank (64) into the sampling bottle (212), to draw a solution in the sampling bottle (212) into the reaction bottle (21), and to draw a liquid reagent in the liquid reagent storage tank (61) into the reaction bottle (21). The cuvette (32) is provided on a conveyor (33). The sampling syringe (29) can draw all solution in the reaction bottle (21) into the cuvette (32) provided on the conveyor (33). The analysis module comprises a spectrophotometer. The device can shorten a cycle of measuring an atmospheric salt content, and improve test precision.

13 Claims, 5 Drawing Sheets

(51) Int. Cl.
| | |
|---|---|
| *G01N 21/64* | (2006.01) |
| *G01N 33/52* | (2006.01) |
| *C07C 309/65* | (2006.01) |
| *C07C 309/73* | (2006.01) |
| *A01N 1/02* | (2006.01) |
| *G01N 1/40* | (2006.01) |
| *G01N 33/543* | (2006.01) |
| *G01N 33/532* | (2006.01) |
| *G01N 33/569* | (2006.01) |
| *G01N 33/72* | (2006.01) |
| *B01L 3/00* | (2006.01) |
| *G01N 27/414* | (2006.01) |
| *G01N 21/01* | (2006.01) |
| *G01N 21/31* | (2006.01) |
| *G01N 35/04* | (2006.01) |

(52) U.S. Cl.
CPC ...... B01L 2300/069 (2013.01); G01N 2035/0401 (2013.01)

(58) Field of Classification Search
CPC ........... G01N 2035/0401; G01N 21/78; G01N 1/2273; G01N 2021/0112
See application file for complete search history.

(56) References Cited

FOREIGN PATENT DOCUMENTS

| | | |
|---|---|---|
| CN | 106338554 | 1/2017 |
| CN | 107290256 | 10/2017 |
| CN | 110044830 | 7/2019 |

OTHER PUBLICATIONS

State Administration for Market Regulation, "Method of the measuring environmental parameters for electric and electronic products—Part 2: Salt mist" National standards of People's Republic of China, GB/T 10593.2-2012, Nov. 5, 2012, with English abstract thereof, pp. 1-11.

Zhou, "Study on Automatic Measurement System of Salt Fog on Islands", Master's Thesis, Jan. 2018, College of Biomedical Engineering and Instrument Science, Zhejiang University.

"International Search Report (Form PCT/ISA/210)" of PCT/CN2019/125041, dated Feb. 25, 2020, with English translation thereof, pp. 1-6.

\* cited by examiner

DEVICE FOR ONLINE DETECTION OF ATMOSPHERIC SALT FOG CONTENT AND DETECTION METHOD THEREOF

CROSS-REFERENCE TO RELATED APPLICATION

This application is a 371 of international application of PCT application serial no. PCT/CN2019/125041, filed on Dec. 13, 2019, which claims the priority benefit of China application no. 201910278937.8, filed on Apr. 9, 2019. The entirety of each of the above mentioned patent applications is hereby incorporated by reference herein and made a part of this specification.

BACKGROUND

Technical Field

The disclosure relates to a device for online detection of atmospheric salt fog content and a detection method thereof.

Description of Related Art

Salt fog refers to a mass system composed of salt-containing microdroplets in the atmosphere, which is formed mainly due to the following. Large amounts of foam and bubbles are produced from vigorous disturbance of seawater in the ocean, breaking of wind and waves, and waves hitting the shore. Microdroplets are produced when the bubbles burst. Most seawater droplets drop down due to gravity, while some are distributed onto the sea surface in a state of homo-vortex diffusion and balance, rise into the air along with the air current, and evolve into a mass system through processes such as cracking, evaporation, and mixing to form an atmospheric salt core.

The maximum amount of salt fog content in the air appears over the ocean. The salt fog content over the land is affected by atmospheric conditions, degree of seawater evaporation, wind direction, and wind speed diffusion. Salt fog mainly settles on the coast and coastal areas near the coast, so that the air in coastal areas contain a large amount of chloride ions. Chloride ions have a great destructive effect on metal protective films, thereby accelerating the corrosion of metal substances, causing the original strength of equipment serving in such environment to be destroyed, and resulting in serious consequences to the safe operation of the equipment. In order to find an efficient way to protect equipment from corrosion, the atmospheric salt fog content of the environment must first be precisely grasped. However, the atmospheric salt fog content is not static, and changes along with weather changes (for example, wind direction, wind speed, rainfall, etc.), seasonal changes, distance from the shore, and other factors, making it difficult to detect the salt content.

At present, the commonly used detection methods for atmospheric salt fog content mainly include wet etching method, dry sheet method, etc. For the specific test process, please refer to GB/T 19292.3-2018: "Corrosion of metals and alloys—Corrosivity of atmospheres". For these methods, the data acquisition cycles are long, which are generally one month, the data is greatly affected by wind speed, wind direction, etc. in the environment, the repeatability is poor, and the operation is relatively complicated, which is greatly affected by human factors that cause the reliability of the data to be questionable. There is an urgent need for a method that shortens the experimental cycle and has stable and reliable test data to monitor the atmospheric salt fog content in real time.

SUMMARY

The disclosure provides a device for online detection of atmospheric salt fog content and a detection method thereof, which aim to shorten the experimental cycle and improve the stability of test data.

Firstly, GB/T 10593.2-2012 is cited to explain the definition of atmospheric salt fog content. The atmospheric salt fog content refers to the salt content per unit volume of the atmosphere, which is proportional to the mass of chloride ions in the air.

One of the objectives of the disclosure is to provide a device for online detection of atmospheric salt fog content, which includes a sampling module and an analysis module. The sampling module includes a liquid absorbent storage tank, a liquid reagent storage tank, an air pump, a relay pump, a sampling bottle, a reaction bottle, a sampling syringe, and a cuvette. The air pump is used to draw the atmosphere into the sampling bottle. The relay pump is used to draw a liquid absorbent in the liquid absorbent storage tank into the sampling bottle, draw a solution in the sampling bottle into the reaction bottle, and draw a liquid reagent in the liquid reagent storage tank into the reaction bottle. The cuvette is provided on a conveyor. The sampling syringe is installed on a movable component, and the movable component drives the sampling syringe to move between the reaction bottle and the conveyor, so that the sampling syringe can draw and inject all solution in the reaction bottle into the cuvette provided on the conveyor.

The analysis module includes a spectrophotometer. The spectrophotometer is used to detect the absorbance of the injected solution in the cuvette.

The sampling syringe of the disclosure is connected onto the movable component through a lifting mechanism. The movable component is a sliding block installed on a sliding rail.

As a preferred design of the disclosure, the device includes a control chamber, a reaction chamber, an analysis chamber, a conveyor driving chamber, a pump fixing chamber, and a storage tank chamber. The control chamber is provided with a display module, an electrical control component, and a power supply. The reaction chamber is provided with the sampling bottle, the reaction bottle, the sampling syringe, and the movable component. The analysis chamber is provided with the spectrophotometer. The conveyor driving chamber is provided with a driving mechanism for driving a conveyor to move. The pump fixing chamber is provided with the air pump and the relay pump. The storage tank chamber is provided with the liquid absorbent storage tank and the liquid reagent storage tank. The conveyor is provided between the reaction chamber and the analysis chamber, and the conveyor is fixed with multiple cuvettes. The electrical control component is used to control the actions of the air pump, the relay pump, the movable component, and the driving mechanism of the conveyor.

The reaction chamber of the disclosure is also provided with a cleaning bottle set and a liquid waste bottle. The pump fixing chamber is also provided with a cleaning pump. The cleaning pump is used to draw cleaning liquid to clean the air pump, the relay pump, the sampling bottle, and the reaction bottle. The cleaning liquid finally flows from the cleaning bottle set into the liquid waste bottle.

The sampling bottle of the disclosure is provided with a liquid level controller for monitoring the liquid height in the sampling bottle. When the liquid height in the sampling bottle reaches the position set by the liquid level controller, a buzzer may be used to prompt and stop drawing the liquid absorbent into the sampling bottle.

Multiple grooves are provided on the conveyor of the disclosure. The grooves are used to fix the cuvette.

A damping pad is provided in the pump fixing chamber of the disclosure to absorb the vibration of the device and reduce the phenomenon of data instability caused by the vibration of the device.

The liquid absorbent of the disclosure is a mixture of glycerol and distilled water, and the glycerol concentration is ≤30%. For a short-term test, the ventilation time for the atmosphere with a volume $V_g$ to enter each time is less than 30 minutes. For a long-term test, the ventilation time for the atmosphere with the volume $V_g$ to enter each time is greater than or equal to 30 minutes. The glycerol concentration of the liquid absorbent when used in the short-term test is less than the glycerol concentration of the liquid absorbent when used in the long-term test. For example, in a normal temperature environment, the glycerol concentration for the short-term test should be 5% to 10%, while the glycerol concentration for the long-term test should be 10% to 20%. The concentration may be increased in a harsh environment, but the maximum glycerol concentration should not exceed 30%. The harsh environment has a temperature of higher than 25° C. or lower than −25° C. Other stabilizers may also be added into deionized water as the liquid absorbent for absorbing chloride ions.

The liquid reagent of the disclosure is a mixture of iron nitrate solution, nitric acid, Tween 80, and mercuric thiocyanate-methanol, and other liquid reagents that have chromogenic reaction with chloride ions may also be adopted, so that chloride ions in the liquid absorbent and the liquid reagent fully react to test the absorbance.

A second objective of the disclosure is to provide the detection method of the detection device, which includes the following steps.

S1: An absorbance-concentration standard curve is made. Different concentrations of sodium chloride solutions are prepared as multiple standard sample solutions. Each standard sample solution with a volume $V_{standard}$ is respectively mixed uniformly with each liquid reagent with a volume $V_{reagent}$, so that chloride ions in the standard sample solutions fully react to obtain multiple mixed sample solutions. The absorbance of the mixed sample solution is tested through the spectrophotometer to obtain the absorbance-concentration standard curve of the mixed sample solution.

In the disclosure, the sodium chloride solution concentration used to make the absorbance-concentration standard curve should be less than or equal to 6 mg/L, so that the absorbance-concentration standard curve is a linear curve.

S2: The liquid absorbent with a volume $V_1$ is drawn from the liquid absorbent storage tank into the sampling bottle.

S3: The atmosphere with a volume $V_g$ in the area to be detected is drawn into the sampling bottle. The atmosphere is absorbed by the liquid absorbent to form a first sampling solution.

S4: The first sampling solution with a volume $V_2$ is drawn from the sampling bottle into the reaction bottle, and the liquid reagent is drawn from the liquid reagent storage tank into the reaction bottle, so that chloride ions in the sampling solution in the reaction bottle fully react. Then, the sampling solution is shaded and left still to form a first reaction solution.

S5: All of the first reaction solution in the reaction bottle is drawn into a first cuvette through the sampling syringe. The first cuvette is transferred from the reaction chamber to the analysis chamber through the conveyor. The absorbance of the first reaction solution in the first cuvette is tested by the spectrophotometer.

The test wavelength range of the spectrophotometer of the disclosure is 200 nm to 780 nm, where 200 nm≤test wavelength adopted by the short-term test<380 nm; and 380 nm≤test wavelength adopted by the long-term test<780 nm.

S6: The chloride ion concentration in the first reaction solution is calculated according to the measured absorbance of the first reaction solution and the absorbance-concentration standard curve in Step S1.

S7: Steps S3 to S6 are repeated. A sampling solution $N_{2-n}$ and a reaction solution $N_{2-n}$ are sequentially obtained. The chloride ion concentration in the reaction solution $N_{2-n}$ is obtained, where n is the number of times of drawing the atmosphere with the volume $V_q$, that is, the number of tests of the absorbance of the reaction solution within one test cycle.

S8: The salt fog content in the atmosphere is calculated according to the chloride ion concentration in the reaction solution $N_{1-n}$ together with a conversion formula between chloride ions and the atmospheric salt fog content.

In Step S6 and Step S7, the obtained chloride ion concentration in the reaction solution $N_{1-n}$ is compared with a saturated concentration value. When the obtained chloride ion concentration is less than the saturated concentration value, the measured value is valid, and the valid measured value is recorded. When the obtained chloride ion concentration is greater than or equal to the saturated concentration value, the measured value this time is invalid, and the measured value this time is discarded. One test cycle is completed. The device is cleaned. The saturated concentration value is the chloride ion concentration of the liquid absorbent after saturated absorption of chloride ions.

In the disclosure, an atmospheric salt fog content $S_n$ and a chloride ion concentration $[Cl^-]_n$ measured in Step S8 satisfy the formulae:

$$S_n = A \cdot \frac{m_n}{V_q};$$
$$m_n = \{V_1 - (n-1) \cdot V_2\} \cdot [Cl^-]_n - m_{(n-1)}; \text{ where } m_0 = 0,$$

$S_n$: the atmospheric salt fog content of the n-th test with unit mg/m$^3$;

$[Cl^-]_n$: the chloride ion concentration in the sample solution of the n-th test with unit mg/L;

n: the number of times of drawing the atmosphere with the volume $V_q$, that is, the number of tests;

A: the conversion factor, which is an empirical constant;

$m_n$: the mass of chloride ions in the atmosphere with the volume $V_q$ of the n-th test with unit mg;

$m_{n-1}$: the mass of chloride ions in the atmosphere with the volume $V_q$ of the (n−1)-th test with unit mg;

$V_1$: the volume of the liquid absorbent of one test cycle with unit mL;

$V_2$: the volume of the liquid absorbent drawn for each test with unit mL;

$V_q$: the volume of the atmosphere drawn for each test with unit L.

The detection method of the disclosure also includes the following steps.

Step S9: An average value of atmospheric salt fog contents $S_1$ to $S_n$ is calculated.

Before Step S2, the detection method of the disclosure also includes the following step.

Step S2': The device precision is checked.

In the detection method of the disclosure, within one test cycle, when the chloride ion concentration of the next test is less than or equal to the chloride ion concentration of the previous test, the measured value is invalid, and the device precision is checked and the device is cleaned.

The disclosure has the following significant effects.

1. By combining the sampling module and the analysis module, the disclosure may continuously measure and analyze the atmospheric salt fog content multiple times. The test obtains air within an area by drawing, and the air is absorbed through the liquid absorbent. The method has no directionality and is less affected by wind speed and wind direction, which improves the reliability of the measured data.

2. The device of the disclosure is simple to operate and may be used for on-site tests anytime and anywhere. Compared with the traditional wet etching method and dry sheet method, the time for a single test is about 1 hour, and the on-site testing of the atmospheric salt fog content may be completed in one day, which may be divided into multiple draws of the atmosphere in the morning, noon, evening, etc. or continuous tests in one day to obtain precise salt fog contents, so that the test cycle is significantly shortened.

BRIEF DESCRIPTION OF THE DRAWINGS

The disclosure will be further described in detail below with reference to the drawings and specific embodiments.

DETAILED DESCRIPTION OF DISCLOSED EMBODIMENTS

Embodiment 1

Figure 1:
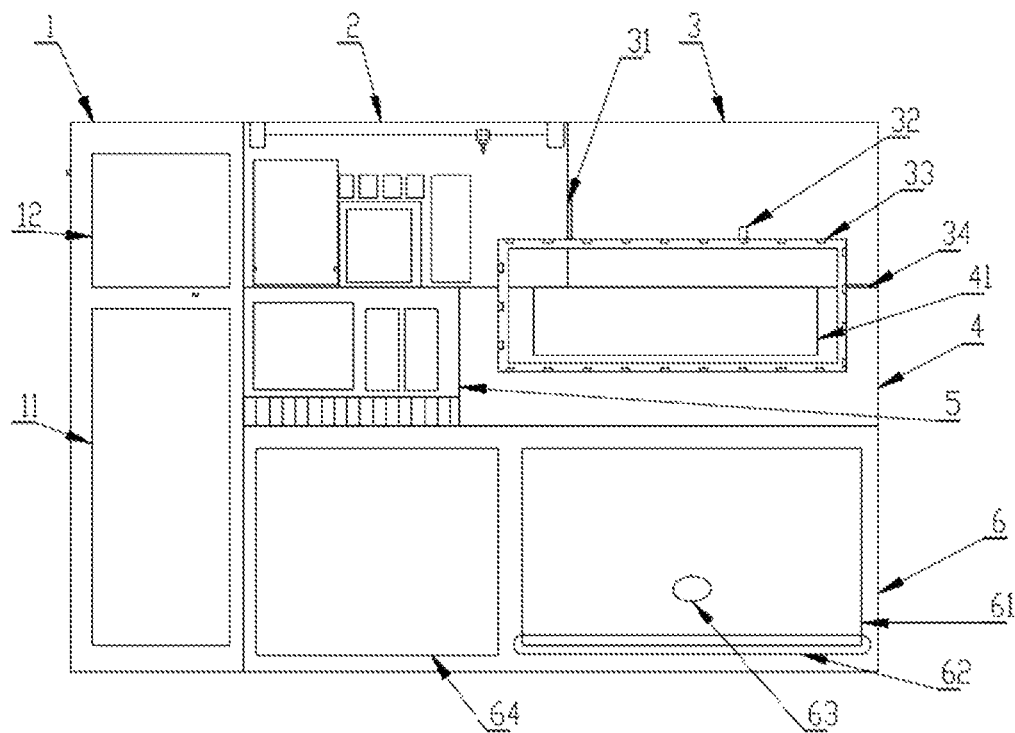
FIG. 1 is a schematic diagram of the principle of a device for online detection of atmospheric salt fog content according to Embodiment 1 of the disclosure.
Figure 2:
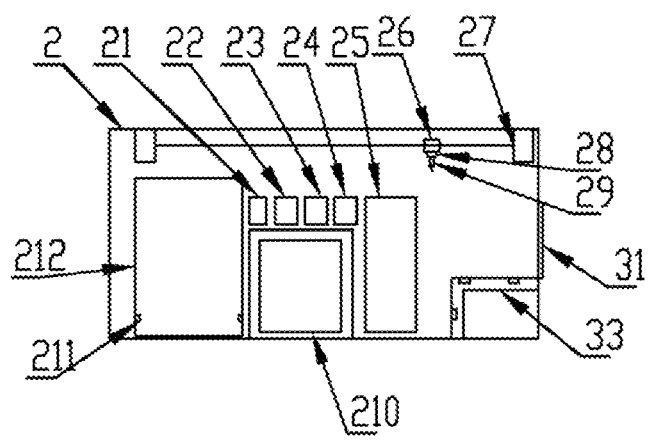
FIG. 2 is a simplified diagram of a reaction chamber in FIG. 1.
Figure 3:
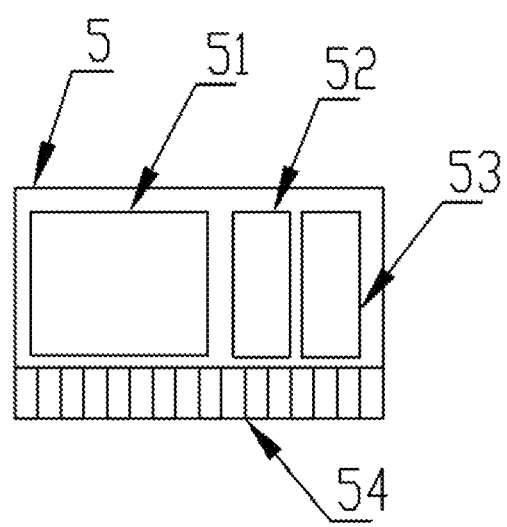
FIG. 3 is a simplified diagram of a pump fixing chamber in FIG. 1.

As shown in FIG. 1 to FIG. 3, a device for online detection of atmospheric salt fog content of the disclosure includes a control chamber 1, a reaction chamber 2, an analysis chamber 3, a conveyor driving chamber 4, a pump fixing chamber 5, and a storage tank chamber 6. The control chamber 1 is provided with a display module 12, an electrical control component, and a power supply 11. The reaction chamber 2 is provided with a sampling bottle 212, a reaction bottle 21, a cleaning bottle 22, a cleaning bottle 23, a cleaning bottle 24, a liquid waste bottle 25, a sampling syringe 29, and a movable component 26. A liquid level controller 211 for monitoring the liquid height in the sampling bottle 212 is provided in the sampling bottle 212. The sampling syringe 29 is connected onto the movable component 26 through a lifting mechanism 28. The movable component 26 is a sliding block installed on a sliding rail 27. The sampling syringe 29 may move left and right and lift up and down. The analysis chamber 3 is provided with a spectrophotometer (not shown). A conveyor 33 is provided between the reaction chamber 2 and the analysis chamber 3. The conveyor driving chamber 4 is provided with a driving mechanism for driving the conveyor 33 to move. Multiple grooves are provided on the conveyor 33. The grooves are used to fix a cuvette 32 and there are multiple cuvettes 32 fixed onto the conveyor 33. The sampling syringe 29 moves between the reaction bottle 21 and the conveyor 33, so that the sampling syringe 29 can draw and inject all solution in the reaction bottle 21 into the cuvette 32 provided on the conveyor 33.

In the disclosure, a first transfer gate 31 is provided between the reaction chamber 2 and the analysis chamber 3, a second transfer gate 34 is provided between the analysis chamber 3 and the conveyor driving chamber 4, and a cuvette storage tank 41 may also be provided in the conveyor driving chamber 4.

The pump fixing chamber 5 is provided with an air pump 51, a relay pump 52, and a cleaning pump 53, and a damping pad 54 is provided under each pump in the pump fixing chamber 5. The storage tank chamber 6 is provided with a liquid absorbent storage tank 64 and a liquid reagent storage tank 61. The liquid absorbent storage tank 64 contains a 1:5 mixture of glycerol and distilled water. The liquid reagent storage tank 61 is a brown liquid storage tank containing a mixture of iron nitrate solution (50 g/L), nitric acid (nitric acid:water=1:2), Tween 80 (20 g/L), and mercuric thiocyanate-methanol (4 g/L), and a stirring device is provided in the liquid reagent storage tank 61 to keep a liquid reagent uniformly mixed. In the embodiment, the stirring device uses a magnetic stirring structure composed of a magnetic stirrer 62 and a magneton 63.

In the disclosure, the liquid absorbent storage tank 64, the liquid reagent storage tank 61, the air pump 51, the relay pump 52, the cleaning pump 53, the sampling bottle 212, the reaction bottle 21, the cleaning bottle, and the liquid waste bottle 25 are communicated by corresponding pipes, so that the air pump 51 can draw the atmosphere into the sampling bottle 212; the relay pump 52 can draw a liquid absorbent in the liquid absorbent storage tank 64 into the sampling bottle 212, draw a solution in the sampling bottle 212 into the reaction bottle 21, and draw the liquid reagent in the liquid reagent storage tank 61 into the reaction bottle 21; the cleaning pump 53 can pump cleaning liquid to clean the air pump 51, the relay pump 52, the sampling bottle 212, and the reaction bottle 21. The cleaning liquid may be the liquid absorbent in the liquid absorbent storage tank 64 or other external cleaning liquid. The cleaning liquid waste finally flows into the liquid waste bottle 25 via the cleaning bottle.

In the disclosure, the actions of the air pump 51, the relay pump 52, the cleaning pump 53, the movable component 26, the lifting mechanism 28, and the driving mechanism of the conveyor 33 are controlled by the electrical control component according to a set time sequence.

The detection method of the disclosure includes the following steps.

S1: An absorbance-concentration standard curve is made. Six sodium chloride solutions are prepared as standard sample solutions. The sodium chloride contents are respectively 0 mg/L, 0.2 mg/L, 0.5 mg/L, 1 mg/L, 2 mg/L, and 4 mg/L. 0.5 mL of each standard sample solution is respectively mixed uniformly with each liquid reagent with a volume $V_{reagent}$=2 mL, so that chloride ions in the standard sample solutions fully react to obtain six mixed sample solutions. The absorbance of the mixed sample solution is tested through the spectrophotometer to obtain the absorbance-concentration standard curve of the mixed sample solution. The standard curve is a linear curve.

S2: The liquid absorbent with a volume $V_1=50$ mL is drawn from the liquid absorbent storage tank 64 into the sampling bottle 212.

S3: The atmosphere with a volume $V_q=5$ L in the area to be detected is drawn into the sampling bottle 212. The atmosphere is absorbed by the liquid absorbent to form a first sampling solution.

S4: The first sampling solution with a volume $V_2=0.5$ mL is drawn from the sampling bottle 212 into the reaction bottle 21, and 2 mL of the liquid reagent is drawn from the liquid reagent storage tank 61 into the reaction bottle 21, and is shaken, so that chloride ions in the sampling solution in the reaction bottle 21 fully react. Then, the sampling solution is shaded and left still for 25 minutes to form a first reaction solution.

S5: All of the first reaction solution in the reaction bottle 21 is drawn into a first cuvette through the sampling syringe 29. The first cuvette is transferred from the reaction chamber 2 to the analysis chamber 3 through the conveyor 33. The absorbance of the first reaction solution in the first cuvette is tested by the spectrophotometer.

S6: The chloride ion concentration in the first reaction solution is calculated according to the measured absorbance of the first reaction solution and the absorbance-concentration standard curve in Step S1.

S7: Steps S3 to S6 are repeated. A sampling solution $N_{2-n}$ and a reaction solution $N_{2-n}$ are sequentially obtained. The chloride ion concentration in the reaction solution $N_{2-n}$ is obtained, where n is the number of times of drawing the atmosphere with the volume $V_q$, that is, the number of tests of the absorbance of the reaction solution within one test cycle.

In Step S6 and Step S7, the obtained chloride ion concentration in the reaction solution $N_{1-n}$ is compared with a saturated concentration value. When the obtained chloride ion concentration is less than the saturated concentration value, the measured value is valid, and the valid measured value is recorded. When the obtained chloride ion concentration is greater than or equal to the saturated concentration value, the measured value this time is invalid, and the measured value this time is discarded. One test cycle is completed. The device is cleaned through the cleaning pump. The saturated concentration value is the chloride ion concentration of the liquid absorbent after saturated absorption of chloride ions.

S8: The salt fog content in the atmosphere is calculated according to the chloride ion concentration in the reaction solution $N_{1-n}$ together with a conversion formula between chloride ions and the atmospheric salt fog content.

In the disclosure, measured atmospheric salt fog content $S_n$ and chloride ion concentration $[Cl^-]_n$ satisfy the formulae:

$$S_n = A \cdot \frac{m_n}{V_q};$$

$$m_n = \{V_1 - (n-1) \cdot V_2\} \cdot [Cl^-]_n - m_{(n-1)}; \text{ where } m_0 = 0,$$

$S_n$: the atmospheric salt fog content of the n-th test with unit mg/m³;

$[Cl^-]_n$: the chloride ion concentration in the sample solution of the n-th test with unit mg/L;

n: the number of times of drawing the atmosphere with the volume $V_q$, that is, the number of tests;

A: the conversion factor, which is an empirical constant;

$m_n$: the mass of chloride ions in the atmosphere with the volume $V_q$ of the n-th test with unit mg;

$m_{n-1}$: the mass of chloride ions in the atmosphere with the volume $V_q$ of the (n−1)-th test with unit mg;

$V_1$: the volume of the liquid absorbent of one test cycle with unit mL;

$V_2$: the volume of the liquid absorbent drawn for each test with unit mL;

$V_q$: the volume of the atmosphere drawn for each test with unit L.

Before using the device, it is necessary to complete the inspection and the checking of the device precision.

After the inspection is completed, the pumping flow rate of the air pump 51 is set to 0.2 L/min through the display module. The drawing time is 25 minutes each time, that is, the volume of the atmosphere drawn each time is 5 L. The appropriate wavelength of the spectrophotometer for analysis is set, such as 380 nm, and the total number of sampling cycles and the number of cleanings are set. Then, the precision is checked. For the checking of the precision, 4 mg/L of standard chloride ion sample solution is selected, and three tests are performed. The standard deviation of each test needs to be less than 6%. If the deviation is greater than or equal to 6%, debugging is continued until the deviation is less than 6% for three consecutive times. After the checking of the precision is completed, Step S1 starts. In addition, during the test process, if it is found that within one test cycle, the chloride ion concentration of the next test is less than or equal to the chloride ion concentration of the previous test, the measured value is invalid, and the checking of the device precision and the cleaning of the device need to be performed again. When there is no data abnormality in the test, the device may be cleaned after each cycle is completed to ensure the prevision of the test data.

The disclosure obtains precise atmospheric salt fog contents through respectively calculating atmospheric salt fog contents $S_1$ to $S_n$ measured each time, and then calculating the average value. If the average salt fog content on a certain day needs to be measured more precisely, multiple cyclic tests in time periods may be performed to obtain the average value. For example, if the average salt fog content on a certain day needs to be measured precisely, the salt fog contents in the morning, noon, and evening may be respectively measured to obtain the average value.

Embodiment 2

Figure 4:
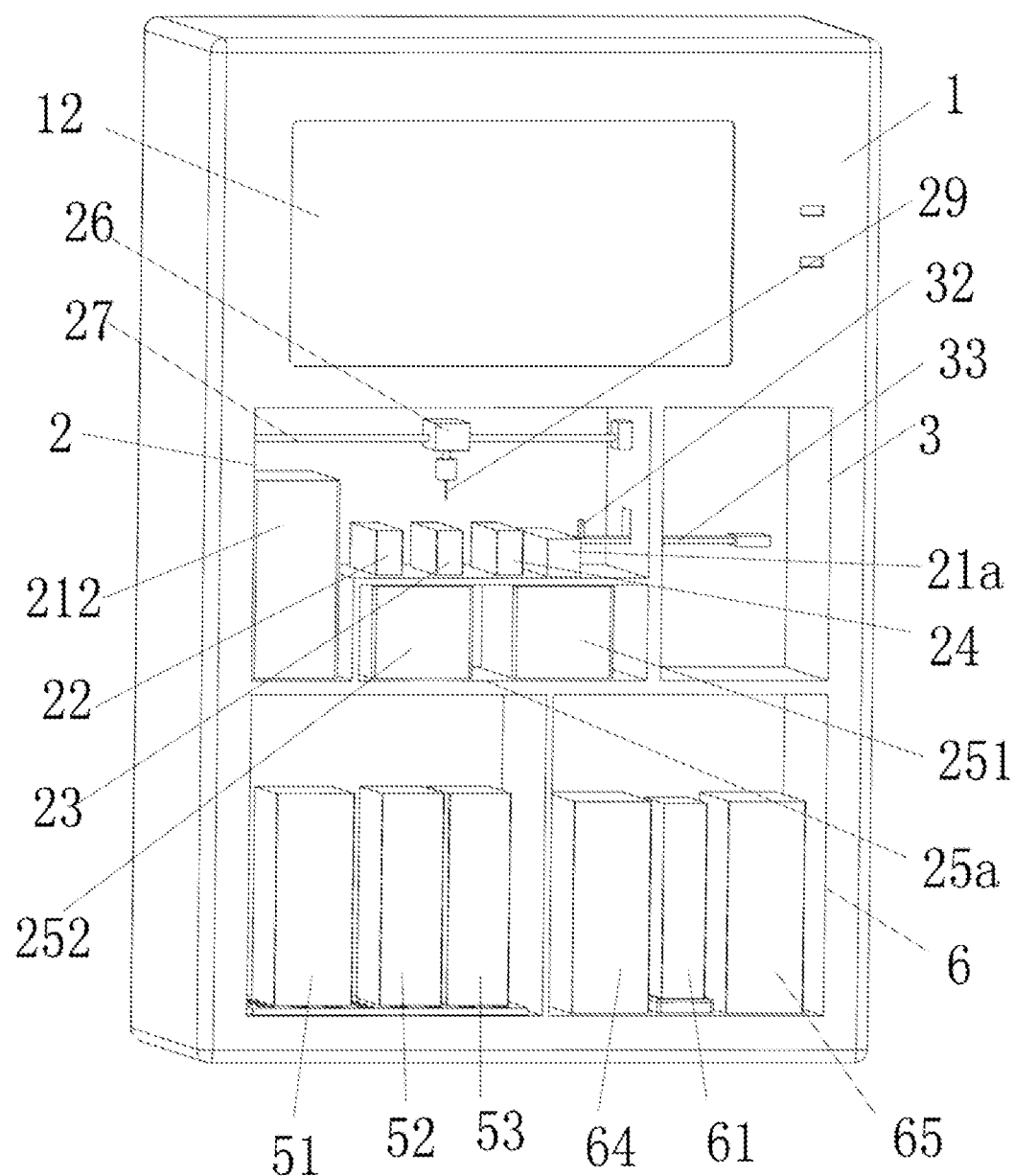
FIG. 4 is a perspective diagram of a device for online detection of atmospheric salt fog content according to Embodiment 2 of the disclosure.
Figure 5:
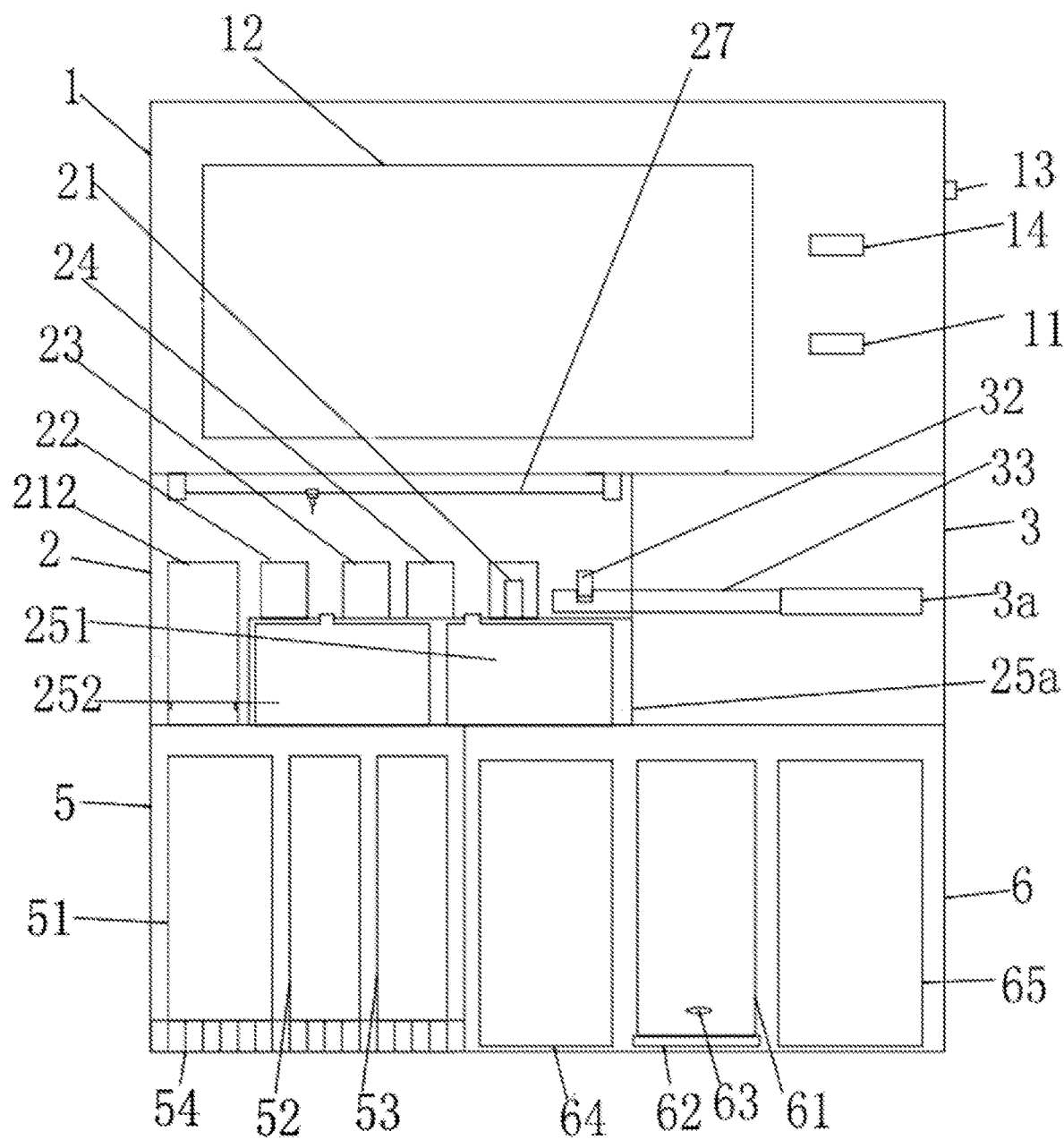
FIG. 5 is a schematic diagram of the principle of a device for online detection of atmospheric salt fog content according to Embodiment 2 of the disclosure.
Figure 6:
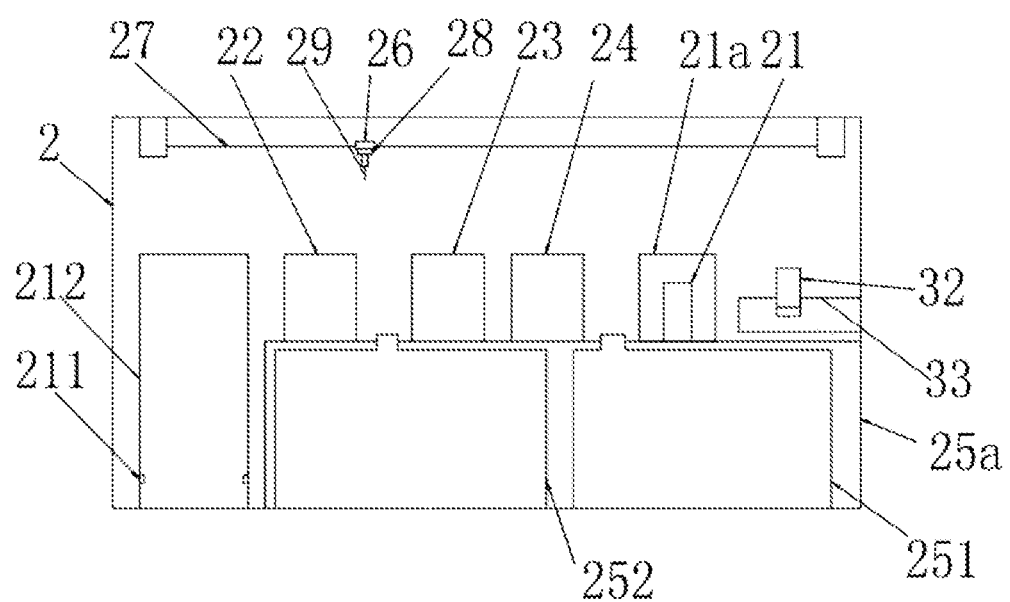
FIG. 6 is a simplified diagram of a reaction chamber in FIG. 5.

The difference from Embodiment 1 is that, as shown in FIG. 4 to FIG. 6, a device for online detection of atmospheric salt fog content in the present embodiment changes the structural layout of the control chamber 1, the reaction chamber 2, the analysis chamber 3, the pump fixing chamber 5, and the storage tank chamber 6.

The display module 12 in the control chamber 1 may adopt a touch screen, and may also display test data and be used to set control parameters in addition to displaying the absorbance-concentration standard curve. A data output port 13 for downloading the test data and a printer output port 14 for printing the test data are also provided in the control chamber 1.

In the analysis chamber 3, the conveyor 33 for transporting the cuvette 32 is also replaced with a telescopic stage. A groove for fixing the cuvette 32 is provided on the telescopic stage. A fixed end 3a of the telescopic stage is located in the analysis chamber 3. The cuvette 32 is carried to and fro between the reaction chamber 2 and the spectrophotometric test area of the analysis chamber 3 through the telescopic stage. Compared with the conveyor of circular movement in Embodiment 1, the telescopic stage occupies less space, so the conveyor driving chamber is eliminated.

In addition, in the present embodiment, in the reaction chamber 2, the liquid waste bottle 25 in Embodiment 1 is replaced with a first liquid waste tank 251 and a second liquid waste tank 252 as shown in FIG. 4 to FIG. 6. Correspondingly, a cleaning liquid tank 65 is added inside the storage tank chamber 6. A solution capable of dissolving chamber products of the reaction chamber is stored in the cleaning liquid tank 65 as cleaning liquid, such as 2% of diluted nitric acid solution. When the liquid absorbent in the liquid absorbent storage tank 64 is adopted as the cleaning liquid, the liquid waste finally flows into the first liquid waste tank 251. When the liquid in the cleaning liquid tank 65 is adopted as the cleaning liquid, the liquid waste finally flows into the second liquid waste tank 252. The first liquid waste tank 251 and the second liquid waste tank 252 are separated from the sampling bottle 212 and the reaction bottle 21 and are placed in a liquid waste tank chamber 25a. The liquid waste tank chamber 25a is located at the bottom of the reaction chamber 2. In order to facilitate the sampling syringe 29 to inject the solution drawn from the reaction bottle 21 into the cuvette 32, the reaction bottle 21 is placed close to the telescopic stage. In order to facilitate shading and standing still, the reaction bottle 21 is placed in a shading chamber 21a.

As an alternative to the disclosure, when the liquid absorbent is a mixture of glycerol and distilled water, glycerol serves as the stabilizer of the liquid absorbent. The glycerol concentration of the liquid absorbent selected when the atmosphere enters the sampling bottle is related to the time of the atmosphere entering each time. For a short-term test, the ventilation time for the atmosphere with the volume $V_g$ to enter each time is less than 30 minutes. For a long-term test, the ventilation time for the atmosphere with the volume $V_g$ to enter each time is greater than or equal to 30 minutes. The glycerol concentration of the liquid absorbent when used in the short-term test is less than the glycerol concentration of the liquid absorbent when used in the long-term test. For example, in a normal temperature environment, the glycerol concentration for the short-term test may be 5% to 10%, while the glycerol concentration for the long-term test should be 10% to 20%. The concentration may be increased in a harsh environment, but the maximum glycerol concentration should not exceed 30%. The harsh environment has a temperature of higher than 25° C. or lower than −25° C. Other stabilizers may also be added into deionized water as the liquid absorbent for absorbing chloride ions. The liquid absorbent may be a mixture of other organic solutions of hydrophilic, involatile, and easily absorbable chloride ions and deionized water, such as a mixture of ethylene glycol and deionized water. As an alternative to the disclosure, the liquid reagent may also be other solutions that have chromogenic reaction or precipitation reaction with chloride ions, so that chloride ions in the liquid absorbent fully react with the liquid reagent to test the absorbance, such as mercuric thiocyanate and silver chloride. In addition, a substance that may maintain the stability of the reaction product, such as gelatin, needs to be added to the liquid reagent to increase data stability.

When testing the absorbance of the reaction solution in the cuvette, the test light is selected within a wavelength range with large absorbance and stability. For example, for the short-term test, 200 nm≤test wavelength adopted by the short-term test<380 nm; and for the long-term test, 380 nm≤test wavelength adopted by the long-term test<780 nm.

The disclosure not only obtains the average atmospheric salt fog content, but also obtains changes in the salt fog contents in the area to be detected in one day or within a certain period of time.

The foregoing embodiments of the disclosure do not limit the protection scope of the disclosure, and the embodiments of the disclosure are not limited thereto. All modifications, replacements, or changes made to the foregoing structures of the disclosure according to the content of the disclosure and the common technical knowledge and conventional means in the art without departing from the basic technical concepts of the disclosure should fall within the protection scope of the disclosure.

What is claimed is:

1. A device for online detection of atmospheric salt fog content, comprising a sampling module and an analysis module, wherein
the sampling module comprises a liquid absorbent storage tank, a liquid reagent storage tank, an air pump, a relay pump, a sampling bottle, a reaction bottle, a sampling syringe, and a cuvette, wherein the air pump is configured to draw an atmosphere into the sampling bottle,
the relay pump is configured to draw a liquid absorbent in the liquid absorbent storage tank into the sampling bottle, draw a solution in the sampling bottle into the reaction bottle, and draw a liquid reagent in the liquid reagent storage tank into the reaction bottle,
the cuvette is provided on a conveyor,
the sampling syringe is installed on a movable component, and
the movable component is configured to drive the sampling syringe to move between the reaction bottle and the conveyor, such that the sampling syringe is configured to draw and inject all solution in the reaction bottle into the cuvette provided on the conveyor; and
the analysis module comprises a spectrophotometer, the spectrophotometer is configured to detect an absorbance of an injected solution in the cuvette.

2. The device for online detection of atmospheric salt fog content according to claim 1, wherein the device comprises a control chamber, a reaction chamber, an analysis chamber, a conveyor driving chamber, a pump fixing chamber, and a storage tank chamber,
wherein the control chamber is provided with a display module, an electrical control component, and a power supply;
the display module is configured to display an absorbance-concentration standard curve;
the reaction chamber is provided with the sampling bottle, the reaction bottle, the sampling syringe, and the movable component;
the analysis chamber is provided with the spectrophotometer;
the conveyor driving chamber is provided with a driving mechanism for driving the conveyor to move;
the pump fixing chamber is provided with the air pump and the relay pump;
the storage tank chamber is provided with the liquid absorbent storage tank and the liquid reagent storage tank; and the conveyor is provided between the reaction chamber and the analysis chamber, and the conveyor is fixed with a plurality of the cuvettes, the electrical control component is configured to control actions of the air pump, the relay pump, the movable component, and the driving mechanism of the conveyor.

3. The device for online detection of atmospheric salt fog content according to claim 1, wherein the sampling bottle is provided with a liquid level controller for monitoring a liquid height in the sampling bottle.

4. A detection method of the detection device for online detection of atmospheric salt fog content according to any one of claim 1, comprising:
taking a liquid absorbent with a volume $V_1$, successively entering an atmosphere with a volume $V_q$, and
taking a liquid absorbent with a volume $V_2$ for a chloride ion content test after the atmosphere enters each time.

5. The detection method of the detection device for online detection of atmospheric salt fog content according to claim 4, wherein
the liquid absorbent is a mixture of glycerol and distilled water, a glycerol concentration is ≤30%,
a ventilation time for the atmosphere with the volume $V_q$ to enter each time is less than 30 minutes for a short-term test,
the ventilation time for the atmosphere with the volume $V_q$ to enter each time is greater than or equal to 30 minutes for a long-term test, and
the glycerol concentration of the liquid absorbent when used in the short-term test is less than the glycerol concentration of the liquid absorbent when used in the long-term test.

6. The detection method of the detection device for online detection of atmospheric salt fog content according to claim 5, the detection method comprising:
Step S1: making an absorbance-concentration standard curve, preparing different concentrations of sodium chloride solutions as a plurality of standard sample solutions, respectively mixing uniformly each standard sample solution with a volume $V_{standard}$ with each liquid reagent with a volume $V_{reagent}$, so that chloride ions in the standard sample solutions fully react to obtain a plurality of mixed sample solutions, testing an absorbance of a mixed sample solution through a spectrophotometer to obtain the absorbance-concentration standard curve of the mixed sample solution;
Step S2: drawing a liquid absorbent with a volume $V_1$ from the liquid absorbent storage tank into the sampling bottle;
Step S3: drawing an atmosphere with a volume $V_q$ in an area to be detected into the sampling bottle, the atmosphere is absorbed by the liquid absorbent to form a first sampling solution;
Step S4: drawing the first sampling solution with a volume $V_2$ from the sampling bottle into the reaction bottle, and drawing a liquid reagent from the liquid reagent storage tank into the reaction bottle, so that chloride ions in a sampling solution in the reaction bottle fully react, and then shading and standing still the sampling solution to form a first reaction solution;
Step S5: drawing all of the first reaction solution in the reaction bottle into a first cuvette through the sampling syringe, transferring the first cuvette from the reaction chamber to the analysis chamber through the conveyor, and testing an absorbance of the first reaction solution in the first cuvette by the spectrophotometer;

Step S6: calculating a chloride ion concentration in the first reaction solution according to the measured absorbance of the first reaction solution and the absorbance-concentration standard curve in Step S1;
Step S7: repeating Steps S3 to S6, sequentially obtaining a sampling solution $N_{2-n}$ and a reaction solution $N_{2-n}$, and obtaining a chloride ion concentration in the reaction solution $N_{2-n}$, n is a number of times of drawing the atmosphere with the volume $V_q$, that is, a number of tests of an absorbance of a reaction solution within one test cycle; and
Step S8: calculating salt fog content in an atmosphere according to the chloride ion concentration in the reaction solution $N_{1-n}$ together with a conversion formula between chloride ions and the atmospheric salt fog content, wherein
in Step S6 and Step S7, the obtained chloride ion concentration in the reaction solution $N_{1-n}$ is compared with a saturated concentration value, when the obtained chloride ion concentration is less than the saturated concentration value, a measured value is valid, and the valid measured value is recorded, and when the obtained chloride ion concentration is greater than or equal to the saturated concentration value, a measured value this time is invalid, and the measured value this time is discarded, one test cycle is completed, the device is cleaned, and the saturated concentration value is a chloride ion concentration of a liquid absorbent after saturated absorption of chloride ions.

7. The detection method of the detection device for online detection of atmospheric salt fog content according to claim 6, wherein an atmospheric salt fog content $S_n$ and a chloride ion concentration $[Cl^-]_n$ measured in Step S8 satisfy formulae:

$$S_n = A \cdot \frac{m_n}{V_q};$$

$$m_n = \{V_1 - (n-1) \cdot V_2\} \cdot [Cl^-]_n - m_{(n-1)}; \text{ where } m_0 = 0,$$

$S_n$: an atmospheric salt fog content of an n-th test with unit mg/m³;
$[Cl^-]_n$: a chloride ion concentration in a sample solution of the n-th test with unit mg/L;
n: the number of times of drawing the atmosphere with the volume $V_q$, that is, the number of tests;
A: a conversion factor, which is an empirical constant;
$m_n$: a mass of chloride ions in the atmosphere with the volume $V_q$ of the n-th test with unit mg;
$m_{n-1}$: the mass of chloride ions in the atmosphere with the volume $V_q$ of an (n−1)-th test with unit mg;
$V_1$: a volume of a liquid absorbent of one test cycle with unit mL;
$V_2$: the volume of the liquid absorbent drawn for each test with unit mL;
$V_q$: a volume of the atmosphere drawn for each test with unit L.

8. The detection method of the detection device for online detection of atmospheric salt fog content according to claim 7, further comprising:
Step S9: calculating an average value of atmospheric salt fog contents $S_1$ to $S_n$.

9. The detection method of the detection device for online detection of atmospheric salt fog content according to claim 7, wherein a test wavelength range of the spectrophotometer in Step S5 is 200 nm to 780 nm.

10. The detection method of the detection device for online detection of atmospheric salt fog content according to claim 6, wherein within one test cycle, when a chloride ion concentration of a next test is less than or equal to a chloride ion concentration of a previous test, a measured value is invalid, and a device precision is checked and the device is cleaned.

11. The device for online detection of atmospheric salt fog content according to claim 2, wherein the sampling bottle is provided with a liquid level controller for monitoring a liquid height in the sampling bottle.

12. A detection method of the detection device for online detection of atmospheric salt fog content according to any one of claim 2, comprising:
　　taking a liquid absorbent with a volume $V_1$, successively entering an atmosphere with a volume $V_q$, and
　　taking a liquid absorbent with a volume $V_2$ for a chloride ion content test after the atmosphere enters each time.

13. A detection method of the detection device for online detection of atmospheric salt fog content according to any one of claim 3, comprising:
　　taking a liquid absorbent with a volume $V_1$, successively entering an atmosphere with a volume $V_q$, and
　　taking a liquid absorbent with a volume $V_2$ for a chloride ion content test after the atmosphere enters each time.

* * * * *